United States Patent [19]

Horikiri et al.

[11] Patent Number: 4,495,121
[45] Date of Patent: Jan. 22, 1985

[54] PROCESS FOR PRODUCING INORGANIC FIBER

[75] Inventors: Shozo Horikiri, Amagasaki; Hidekimi Kadokura, Niihama; Masaji Harakawa, Niihama; Kunio Saegusa, Niihama; Masao Yamagiwa, Ibaraki, all of Japan

[73] Assignee: Sumitomo Chemical Company, Limited, Osaka, Japan

[21] Appl. No.: 444,044

[22] Filed: Nov. 23, 1982

[30] Foreign Application Priority Data

Nov. 30, 1981 [JP] Japan .................. 56-193315
Sep. 27, 1982 [JP] Japan .................. 57-169324

[51] Int. Cl.³ .................................. C01F 7/02
[52] U.S. Cl. .................. 264/56; 264/176 F; 264/DIG. 19; 501/127
[58] Field of Search .......... 264/178 F, DIG. 19, 264/63, 56, 176 F; 501/127

[56] References Cited

U.S. PATENT DOCUMENTS

| | | | |
|---|---|---|---|
| 3,094,385 | 6/1963 | Brisbin | 501/127 |
| 3,808,015 | 4/1974 | Seufert | 501/127 |
| 3,814,782 | 6/1974 | Hayes | 501/127 |
| 3,865,917 | 2/1975 | Galasso | 501/127 |
| 3,950,478 | 4/1976 | Kenworthy | 264/63 |
| 3,996,145 | 12/1976 | Hepburn | 501/127 |
| 4,101,615 | 7/1978 | Horikiri | 264/63 |

Primary Examiner—John A. Parrish
Attorney, Agent, or Firm—Stevens, Davis, Miller & Mosher

[57] ABSTRACT

A new process for producing an inorganic fiber of superior tensile strength and modulus of elasticity, which comprises spinning a spinning solution in organic solvent of polymetaloxane of good spinnability to form a precursor fiber, calcining said precursor fiber, and wherein said solution contains polymetaloxane comprising 0.1-95 mole % of a structural unit represented by the following general formula [A] and 99.9-5 mole % of the following formula [B]:

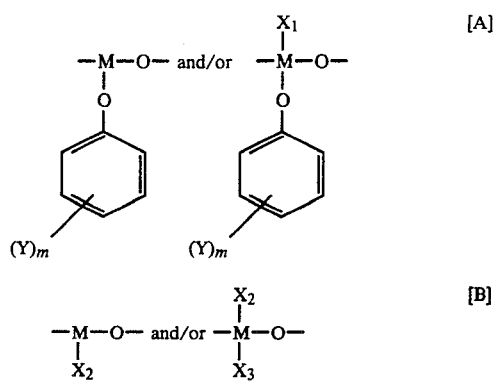

(wherein, M represents a trivalent or tetravalent metal atom, $X_1$ represents an organic group which is the same as or different from

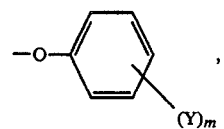

hydrogen, nitro or halogen, $X_2$ and $X_3$ represent an organic group other than

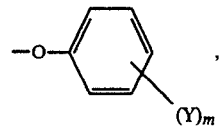

Y represents an organic group, nitro or halogen, m represents an integer from 1 to 3.).

3 Claims, No Drawings

PROCESS FOR PRODUCING INORGANIC FIBER

The present invention pertains to a process for producing inorganic fiber. More particularly, it relates to a process for producing inorganic fiber by spinning a solution of polymetaloxanes containing a phenoxy group. Specifically, it relates to a process for producing inorganic fiber, especially alumina fiber or alumina-silica fiber by spinning a solution of polymetaloxanes containing a phenoxy group as a pendant group, subjecting the resulting precursor fiber to antiflaming-treatment if necessary and then calcining the thus resulting precursor fiber.

With the recent technical development in various fields such as aerospace industry, there have been desired various raw materials having more excellent characteristics, e.g. higher mechanical strength and heat resistance than those of the conventional raw materials.

One of the convenient methods for improving such characteristics of the raw materials is to reinforce the conventional material with a carbon fiber; a fiber of metal such as tungsten, molybdenum or steel; a conjugated fiber obtained by coating the surface of tungsten fiber with boron or silicon carbide; a polycrystalline fiber such as alumina fiber or zirconia fiber; or a whisker such as silicon carbide to give a composite material.

Metal oxide fiber, one of reinforcing material for composite materials has been expected to be utilized not only as simply a reinforcing material but also for many other utilities in various industrial fields, since it can be used even in an oxidative atmosphere and at a high temperature, wherein carbon fiber or metal fiber can not be used, and further since it does not lose superior mechanical properties even at a high temperature because of its high melting point in general.

There have been so far proposed various methods to produce such a metal oxide fiber as disclosed in for example, Japanese Patent Publication (examined) Nos. 26213/1965; 9896/1970; 24690/1969; 718/1972; 30327/1973; 18965/1976 etc.

Previously, the present inventors proposed several methods for the production of inorganic fibers such as alumina, alumina-silica, and zirconia using polymetaloxane as a starting material; Japanese Patent Publication (examined) Nos. 12736/1976; 13768/1976; (unexamined) Nos. 124336/1974; 136424/1975; 18726/1975. These methods disclosed hereabove have many advantages as compared with other methods, since precursor fibers contain a large amount of metal oxide and hence fibers obtained after calcination are dense enough to obtain fibers of higher strength and elasticity, and, further, the spinnability of spinning solutions is better, and continuous fibers can be produced easily.

According to the study by the present inventors, it has been found that spinnability of a spinning solution largely depends upon the kind of organic group as the pendant group of the polymetaloxane. That is, organic groups having a higher number of carbon atom in the pendant group have an effectiveness in the enhancement of spinnability and precursor fiber obtained therefrom is more limber and easy to be treated, and, further, fiber obtained after calcination has an improved strength and elasticity as compared with the case without introduction of such higher organic group or with introduction of lower organic group.

However, when a large amount of higher organic groups is introduced in the pendant group, the metal content in the precursor fiber is lowered and hence the inorganic fiber obtained by calcination is of low density and consequently of inferior strength and elasticity. Specifically speaking, during the calcination, various kinds of gas generated owing to combustion or pyrolysis of higher organic groups to cause differences in the local atmosphere of calcination at the place where higher organic groups are presents, and consequently there are caused differences in the rate of calcination, and thus, in a larger scale of calcination differences in the rate of calcination are remarkably enlarged and there is disadvantageously obtained inorganic fiber of inferior strength and elasticity and unevenness in quality.

In order to avoid these drawbacks and to provide a new method for the production of inorganic fiber, an extensive study has been carried out. As a result, it has been found that a polymetaloxane with a phenoxy group as the pendant group provides extremely superior spinnability as compared with one having the same number of carbon atom as above but no phenoxy group, and, further, provides inorganic fiber of a superior strength and elasticity after calcination of precursor fiber.

One object of the present invention is to provide a new method for the production of inorganic fiber. Another object of the invention is to provide a new method for the production of inorganic fiber of improved strength and elasticity. A further object of the present invention is to provide a new metaloxane as a starting material having a improved spinnability, and then to obtain an inorganic fiber of improved strength and elasticity. These and other object of the present invention will be apparent to persons skilled in the art from the following description.

Thus, the present invention is a process for the production of inorganic fiber characterized by spinning an organic solvent solution of polymetaloxane to form a precursor fiber, followed by calcination, wherein said solution contains polymetaloxane comprising 0.1–95 mole % of a structural unit represented by the general formula [A] and 99.9–5 mole % of the formula [B]:

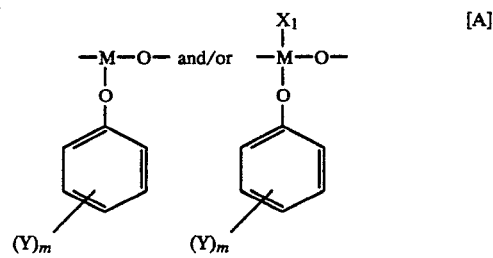

(wherein M represents a trivalent or tetravalent metal atom, Y represents an organic group, nitro or halogen, m represents an integer from 0 to 5, $X_1$ represents an organic group which is the same as or different from

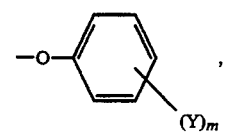

hydrogen, nitro or halogen.)

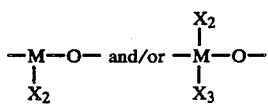

(wherein, M is the same as shown hereinabove, $X_2$ and $X_3$ represent an organic group other than

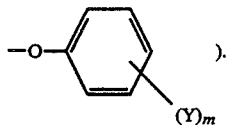

).

Polymetaloxane in which the primary chain consists of alternating metal and oxygen atoms, used in the present invention is a polymer shown hereinabove. In the general formula of the structural unit, M may be a metal which converts easily to a metal oxide by calcination and in general a metal having trivalent or tetravalent valency. As examples, M includes B, Al, Ga, In, Si, Ge, Sn, Pb, Y, Ti, Zr, La, lanthanide, Cr, Mn, Fe, Co and Ni. Of these, Al, Si, Ti and Zr are preferably used.

Y represents an organic group, nitro or halogen. As examples, Y includes alkyl group such as methyl, ethyl, n-propyl, iso-propyl, n-butyl or iso-butyl group, alkoxy group such as methoxy, ethoxy, n-propoxy, iso-propoxy, n-butoxy or iso-butoxy, acyl such as acetyl, propionyl or benzoyl, alkoxycarbonyl such as methoxycarbonyl, ethoxycarbonyl or propoxycarbonyl, phenoxy carbonyl, cyano, alkenyl such as vinyl or propenyl, phenyl or substituted phenyl, phenoxy, halogen such as chlorine or fluorine. In case of plural substitution by Y, the substituents may be the same as or different from each other. m represents a integer of 0–5, preferably 1–3.

$X_1$ represents an organic functional group which is the same as or different from

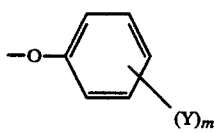

(wherein Y and m are as shown hereinabove), nitro, halogen or hydrogen atom. As examples, $X_1$ includes

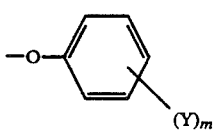

with Y and m are as shown hereinabove, alkyl such as methyl, ethyl, n-propyl, iso-propyl, n-butyl or iso-butyl, alkoxy such as methoxy, ethoxy, n-propoxy, iso-propoxy, n-butoxy or iso-butoxy, acyl such as acetyl, propionyl or benzoyl, halogen such as chlorine or fluorine, nitryl and hydrogen atom.

$X_2$ and $X_3$ represent an organic group other than

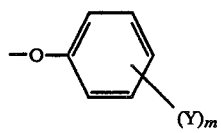

As examples, they include alkyl such as methyl, ethyl, n-propyl, iso-propyl, n-butyl or iso-butyl, alkoxy such as methoxy, ethoxy, n-propoxy, iso-propoxy, n-butoxy or iso-butoxy, acyl such as acetyl, propionyl or benzoyl.

The polymetaloxane used in the present invention is prepared as described below. Firstly, it can be prepared by subjecting an organometallic compound containing a phenoxy group to partial-hydrolysis, wherein said organometallic compound includes dimethyl phenoxy aluminum, diethyl phenoxy aluminum, dipropyl-phenoxy aluminum, dimethoxyphenoxy aluminum, diethoxyphenoxy aluminum, dipropoxyphenoxy aluminum, dimethylacetylphenoxy aluminum, dimethyldiphenoxy titanium, diethyldiphenoxy titanium, di-(methylphenoxy)-diethyl titanium, di-(cyanophenoxy)-dimethyl titanium, dimethyldiphenoxy-silicon, di-(ethoxyphenoxy)-diethyl silicon, p-chloro-phenoxy-trimethoxy silicon, p-nitrophenoxy-triethoxy silicon, p-ethylphenoxy-triiso-propoxy zirconium, diethyldiphenoxy zirconium, di-(ethoxycarbonyl phenoxy)-dimethoxy zirconium, diethylphenoxy indium, p-methoxy-carbonylphenoxydiethoxy indium, o-cyanophenoxy-diisopropoxy indium, dimethyldiphenoxy tin or o-ethoxy carbonylphenoxy-triiso-propoxy tin. Secondly, it can also be prepared by substituting an organic group of a polymetaloxane by the

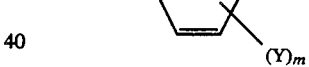

group, wherein said polymetaloxane is provided through partial-hydrolysis of an organometallic compound such as trimethyl aluminum, triethyl aluminum, tripropyl aluminum, triethoxy-aluminum, triisopropoxy aluminum, diethyl aluminum hydride, diisopropoxy monoethyl aluminum, monoethoxy diethyl aluminum, tetraethyl titanium, tetrapropyl titanium, tetrabutyl titanium, tetraethoxy titanium, tetraisopropoxy titanium, tetrabutoxy titanium, triethyl titanium hydride, diethyldiiso-propoxy titanium, tetraethyl zirconium, tetaraiso-propoxy zirconium, tetrabutyl zirconium, trimethyl zirconium hydride, diethyl diisopropoxy zirconium, tetraethyl silicon, tetrapropyl silicon, methyl silicate, ethyl silicate, iso-propyl silicate, trimethyl indium, triethyl indium, triethoxy indium, diethyl iso-propoxy indium, tetramethyl tin, tetraethyl tin, tetrapropyl tin, tetra methoxy tin, tetraethoxy tin or tetraiso-propoxy tin. Thirdly, it can further be provided by subjecting a mixture of an organometallic compound containing a phenoxy group and one not containing a phenoxy group to partial-hydrolysis. Furthermore, it can be provided by mixing a partially hydrolyzed product of an organometallic compound containing a phenoxy group with a partially hydrolyzed product of organometallic compound not containing a phenoxy group.

Partial hydrolysis can be conducted under the hitherto known conditions. As to the method for substitution of organic groups of polymetaloxane by

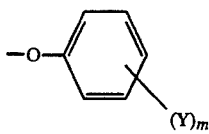

groups, it can be easily attained for example by mixing a polymetaloxane obtained by partial-hydrolysis of an organometallic compound with phenols at a temperature of 0°–100° C. in general, whereby substitution of the pendant group can easily take place.

As for suitable compounds used for the introduction of phenoxy groups to polymetaloxane by substitution reaction there are examplified cresol, ethylphenol, propylphenol, butylphenol, dimethylphenol, methylethylphenol, diethylphenol, methylpropylphenol, ethylpropylphenol, dipropylphenol, trimethylphenol, triethylphenol, methoxyphenol, ethoxyphenol, propoxyphenol, butoxyphenol, dimethoxyphenol, methoxyethoxyphenol, diethoxyphenol, methoxypropoxyphenol, dipropoxyphenol, trimethoxyphenol, triethoxyphenol, hydroxyacetophenone, propionylphenol, butyrylphenol, diacetylphenol, acetylpropionylphenol, dipropionylphenol, triacetylphenol, methyl hydroxybenzoate, ethyl hydroxybenzoate, propyl hydroxybenzoate, butyl hydroxybenzoate, di-(methoxycarbonyl)-phenol, di-(ethoxycarbonyl)-phenol, di-(propoxycarbonyl)-phenol, tri-(methoxycarbonyl)-phenol, tri-(ethoxycarbonyl)-phenol, cyanophenol, chlorophenol, nitrophenol, dinitrophenol or picric acid.

Any organic solvent which can dissolve polymetaloxane, may be employed in the present invention. As examples, ethylether, tetrahydrofuran, dioxane, benzene, toluene, xylene, hexane etc. are given.

The contents of structural unit of general formula [A] mentioned hereinbefore in a raw polymetaloxane (refered to as "substitution ratio" hereinafter) ranges 0.1–95 mole % in general, preferably 1–80%, most preferably 3–20 mole % per metal atom in the polymetaloxane. When the substitution ratio is less than 0.1 mole %, spinnability and physical properties of inorganic fibers can't be sufficiently improved. On the other hand when the substitution ratio is over 95 mole %, spinnability becomes inferior. When the substitution ratio is 1 mole % or more, improvement in spinnability is remarkable as compared with the case of no substitution. Moreover, spinnability is improved as the substitution ratio increases. However, when the substitution ratio is 3 mole % or more, improvement rate in spinnability can't be outstanding any more. Improvement in spinnability and the like also depends on the kinds of coexisting pendant groups represented by $X_2$ and $X_3$.

Generally speaking, polymetaloxane with a substitution ratio of 1–80 mole % shows higher spinnability most steadily. When exceeding 80 mole % of substitution ratio, the improvement effect decreases gradually. Over 95 mole % of substitution ratio, there is no expectation of substitution effect, since the solubility of polymetaloxane in an organic solvent decreases and spinnability becomes equivalent to or less than the case of no substitution, and, further, solid material often precipitates when organic solvent solution of polymetaloxane is concentrated in order to obtain a viscous solution.

The concentration of polymetaloxane in the spinning solution is 20 to 95 weight %, preferably 40 to 90 weight %. When the concentration of polymetaloxane is less than 20% weight %, a large amount of thickening agent (spinning aid) is required which makes too small the density of oxide formed after calcination, and therefore, the strength of inorganic fiber after calcination is undesirably lowered. On the other hand, when the concentration exceeds 95 weight %, the spinning solution is too viscous and the spinning becomes difficult. Anyway, as described in detail hereinabove, when using spinning solution of polymetaloxane having the phenoxy group as a pendant group, its spinnability may be improved and inorganic fiber of extremely higher strength and elasticity can be obtained by spinning and clacining the thus prepared precursor fiber.

The reason why the above-mentioned effects appear by introducing the phenoxy group as a pendant group of polymetaloxane is not quite clear. However, that which has been deduced is discussed hereinafter. A phenoxy group introduced as a pendant group gives polymetaloxane an ordering effect, and consequently spinnability is improved. This is quite beyond the ordinary case wherein a polymetaloxane having pendant group with carbon number as much as those of phenoxy groups is used. In that case the pendant groups introduced burn in a precursor fiber and cause a local overheating and a partial difference in calcination degree of the precursor fiber, whereby the fiber lacks homogeneity and thickness and consequently the strength and elasticity of the fiber unfavorably decrease. On the contrary, in the case of phenoxy group, a considerable amount of phenoxy group decomposes and is removed from the precursor fiber by heating before the temperature reaches calcination temperature, whereby local overheating can be avoided and consequently the fiber strength and elasticity don't decrease during calcination.

As to the polymerization degree of the polymetaloxane used in the present invention, 2 or more is sufficient. There is required specifically no upper limit, however a polymetaloxane with a polymerization degree of 1,000 or less is employed in terms of ease in the polymerization reaction.

The polymetaloxane dissolves in an organic solvent such as ethyl ether, tetrahydrofuran, benzene, toleune, hexane etc. and its solution becomes a viscous solution excellent in spinnability in a proper concentration. The relation between concentration of a polymetaloxane in the solution and spinnability of the solution depends on the kind of polymetaloxane used, its polymerization degree and solvent and therefore cannot be determined uniformly. However, a solution with a viscosity of from 1 to 5000 poise at room temperature is generally suitable for spinning. Consequently, the viscosity of a spinning solution is adjusted so as to fit in that range.

It's desirable for the improvement of spinnability to incorporate an organic polymer such as polyethylene glycol, polyvinyl formal, polyvinyl acetate and the like or an other proper kind of organic compound in the spinning solution.

Moreover, it is desirable for the improvement in physical properties of an inorganic fiber to add, singly or in combination, a small amount of some compound containing Li, Be, B, Na, Mg, Si, P, K, Ca, Ti, Cr, Mn, Y, Zr, La, W and the like to the spinning solution.

By mixing two or more kinds of polymetaloxanes containing metal atoms different from each other followed by spinning and calcination, inorganic fibers having a superior properties such as compound oxide [for example, spinel type oxide (MgAl$_2$O$_4$, Al-Si spinel and the like), perovskite type oxide (LaAlO$_3$ and the like) etc.] can be produced.

According to the present invention method, by preparing spinning solution comprising a polymetaloxane having a phenoxy group as a main starting material and a proper amount of Si-containing compound, spinning said solution followed by calcination of the thus obtained precursor fiber which has a higher amount of silica-alumina, a silica-alumina fiber of extremely high mechanical strength and heat resistance in the form of short fiber, long fiber or continuous fiber can be produced.

A polymetaloxane havng a phenoxy group used in the present invention has an alumina content of 10% or more, preferably 20% or more, wherein said alumina content means the numeral calculated by the following expression:

$$[51/(\text{molecular weight of structural unit})] \times 100 \, (\%).$$

When the alumina content is 10% or less, it is difficult to obtain a silica-alumina base fiber having a practical strength.

As for a compound containing Si, a polyorganosiloxane having a structural unit of

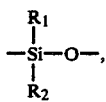

and a polysilicic acid ester having a structural unit of

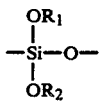

(wherein, R$_1$ and R$_2$ are organic groups) are preferably used and moreover an organosilane having a structure of R$_n$SiX$_{4-n}$ (wherein X represents OH, OR and the like, R represents organic group, n represents an integer of 4 or less), a silicic ester having a structure of Si(OR)$_4$ (wherein R represents organic group) and other Si-containing compound can also be used.

A Si-containing compound to be mixed with a polymetaloxane is desirably of a higher Si content. However, a compound of lower Si content can also be used. When a silica-alumina fiber of low Si content is produced, a Si-containing compound to be mixed may be of lower Si content. A Si-containing compound to be mixed with is preferably dissolved in and mixed with homogeneously a polyaluminoxane solution. However, even when it does not dissolve in the solution, it can also be used as a dispersion mixture. A Si-containing mixture to be mixed with is desired to have a spinnability when it dissolves in an aforementioned polyaluminoxane solution, but this is not essential.

The maximum amount of Si-containing compound to be mixed with a polyaluminoxane solution depends also on the spinnability of the Si-containing compound itself. However even in the case of a Si-containing compound having no spinnability, it can be mixed even in an amount of 60 weight % on the basis of Si content of silica-alumina fiber obtained after calcination. Such a polyaluminoxane solution after the mixing keeps a spinnability enough to be spun. If necessary, two or more kinds of Si-containing compounds can be effectively mixed with a polyaluminoxane solution. It is desirable to adjust the ratio of SiO$_2$:Al$_2$O$_3$ to be 1-30 weight %:99-70 weight % for the production of silica-alumina fibers.

To conduct spinning of a polymetaloxane solution, the so-called dry-spinning method is preferred, however centrifugal pot spinning, blowing processes and the like can also be employed. The spinning is generally carried out at room temperature, but it can also be carried out by heating the spinning solution as needed. The atmosphere wherein the spinning is carried out may be controlled in order to obtain a desirable result. Elimination of solvent contained in the fiber by drying can be conducted during or after the spinning operation. However, in the case of a fine fiber it is not specifically necessary. A precursor fiber produced in the present invention has an average diameter of 1-100 $\mu$m in general. However the diameter can not be restricted to that range.

A precursor fiber obtained by spinning as aforesaid, if necessary, may be subjected to a steam treatment, a hot water treatment, an acid treatment, singly or in combination thereof, followed by calcination. A precursor fiber thus prepared is a fiber comprising fibrous products formed in a highly concentrated, homogenious and continuous state and therefore it is extremely favourable for the enhancement of various physical properties of the inorganic fiber obtained after calcination. The precursor fiber itself obtained by the invention is a transparent fiber of due strength and therefore it can be processed in advance to such a form as a textile followed by calcination, whereby an inorganic product having a desired form can also be obtained.

The precursor fiber of the invention is not melted by heat and can be easily made into inorganic fiber by calcination in an atmosphere containing oxygen such as air, as it is, without losing fiber form. That is, for example, in the case of the production of an alumina based fiber, when said precursor fiber can be calcined in an atmosphere containing oxygen such as air, it changes substantially to an alumina based fiber at about 700° C. and provides a transparent alumina based fibers of sufficient strength.

To obtain various kinds of alumina based fibers, said precursor fiber can be once calcined in an inert atmosphere such as nitrogen or in vacuum, and then calcined in an atmosphere containing oxygen to remove organic or carbon components. An alumina based fiber thus obtained can be further calcined in a reductive atmosphere containing hydrogen. Furthermore, it is desirable to apply tension on the precursor fiber or alumina based fiber during these calcination processes for the production of a strong alumina based fiber.

Calcination temperature varies depending upon the constituent elements of the inorganic fiber and uses of said inorganic fiber. For the production of an inorganic fiber of high strength and high elasticity used for a fiber reinforced composite material, a temperature of 900°-1,800° C. for an alumina fiber, 900°-1,500° C. for a silica-alumina fiber, 800°-1,500° C. for a titania fiber, 1,000°-2,500° C. for a zirconia fiber can be employed respectively. In the case of application of an inorganic fiber for the use as a catalyst (or catalyst support), a fiber of large specific surface area is generally advantageous and, specifically, a temperature of 400°–1,500° C. is employed for an alumina, a silica-alumina, a titania fiber and the like depending upon the reaction conditions for preparing the catalyst. Furthermore, for example, in the case of using a zirconia fiber for utilizing its ionic conductivity, calcination at the transformation temperature or more in the vicinity of about 1,000°–1,100° C. is prefered. Thus, calcination conditions vary according to uses of the fiber and oxide constituents.

According to the method of the present invention for producing a metal oxide fiber from a polymetaloxane, various properties can be provided. That is, the spinnability can be improved predominantly, and besides, the tensile strength and elasticity of said metal oxide fiber can be remarkably enhanced.

The present invention will be hereinafter explained further in detail by the following examples which are not intended to limit the scope of the invention.

Example 1

Monoisopropoxydiethyl aluminum (1 mole) was dissolved in ethylether (600 ml) and hydrolyzed by water (1 mole) and polyisopropoxy aluminoxane of polymerization degree 130 was obtained. Then ethyl o-hydroxybenzoate (0.1 mole) was added to the stirred solution and 0.1 mole of the isopropoxy group in the polyisopropoxy aluminoxane was substituted by

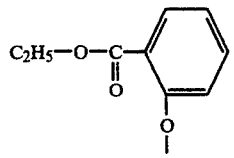

during stirring under reflux.

Polyaluminoxane thus prepared was dissolved in benzene and ether was distilled off, then ethyl silicate (0.07 mole) of the structural formula

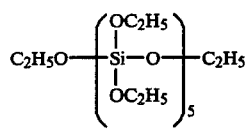

was dissolved therein.

The concentration of the polyaluminoxane solution adjusted to concentration of 55 weight % has a viscosity of 300 poises and is a transparent homogeneous solution without unevenness of viscosity. The thus prepared polyaluminoxane solution was used as a spinning solution. After defoaming, extrusion spinning was carried out from a spinneret having 96 apertures 50 μm in diameter into a spinning tube 6 m in length at a speed of 50 m/min.

The precursor fibers thus obtained were transparent and 15 μm in diameter. After being left to stand in an atmosphere of 100% relative humidity at 80° C. for 15 minutes, said precursor fibers were calcined in the air in a furnace at an increasing rate of temperature of 300° C./hr till it reached 1,200° C. to obtain colorless and transparent silica-alumina fibers containing 20 weight % of silica.

The thereby obtained silica-alumina fibers of 20 in number were subjected to measurements of diameter, tensile strength and modulus of elasticity and found to have average diameter of 9.0 μm with coefficient variation of 0.2 μm (assessed to be extremely small), tensile strength of 25 t/cm$^2$ and modulus of elasticity of 2,000 t/cm$^2$, wherein these strength were measured at gauge length of 20 mm which is the same condition in this respect also in the following examples.

Examples 2–10 and Comparative Examples 1 and 2

Monoisopropoxydiethyl aluminum (1 mole) was dissolved in ethylether (600 ml) and hydrolyzed by water (1 mole) to obtain polyisopropoxy aluminoxane of polymerization degree 130. In each amount shown in the Table 1, p-hydroxyacetophenone was respectively added to the stirred solution of said polyisopropoxy aluminoxane and each isopropoxy group in the polyisopropoxy-aluminoxane was substituted by a

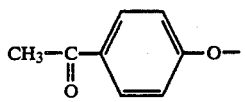

group during stirring under reflux. Almost 100% of isopropoxy groups were found to be substituted with acetophenoxy groups. 0.07 Mole of ethylsilicate similar to that used in Example 1 was added to each of the solutions and then the solutions were concentrated respectively. After defoaming said concentrated solutions were subjected to dry-spinning respectively from a spinneret having 96 apertures 50 μm in diameter into a spinning tube 6 m in length.

The thus obtained precursor fibers were calcined just in the same manner as in Example 1 to obtain colorless and transparent silica-alumina fibers containing 20 weight % of silica. Physical properties of these silica-alumina fibers were measured. The results are shown in Table 1.

TABLE 1

|  | Mole fraction of p-hydroxyacetophenone (per Al atom) | Diameter of precursor fiber (μm) | C.V. of fiber diameter (μm) | Fiber diameter (μm) | Tensile strength (t/cm$^2$) | Modulus of elasticity (t/cm$^2$) |
| --- | --- | --- | --- | --- | --- | --- |
| Comparative Example 1 | 0 | 35–40 | 3.5 | 22–26 | 12 | 1,600 |
| Example 2 | 0.001 | 33 | 2.9 | 20 | 15 | 1,900 |
| Example 3 | 0.01 | 27 | 1.0 | 16 | 18 | 2,000 |
| Example 4 | 0.02 | 23 | 0.5 | 14 | 18 | 2,000 |
| Example 5 | 0.05 | 18 | 0.5 | 11 | 20 | 2,000 |
| Example 6 | 0.2 | 15 | 0.4 | 9 | 22 | 2,000 |
| Example 7 | 0.5 | 15 | 0.4 | 9 | 22 | 2,000 |
| Example 8 | 0.7 | 15 | 0.4 | 9 | 22 | 2,000 |

TABLE 1-continued

|  | Mole fraction of p-hydroxyaceto-phenone (per Al atom) | Diameter of precursor fiber ($\mu$m) | C.V. of fiber diameter ($\mu$m) | Fiber diameter ($\mu$m) | Tensile strength (t/cm$^2$) | Modulus of elasticity (t/cm$^2$) |
|---|---|---|---|---|---|---|
| Example 9 | 0.9 | 25 | 1.2 | 15 | 17 | 1,900 |
| Example 10 | 0.95 | 35 | 3.0 | 22 | 14 | 1,700 |
| Comparative Example 2 | 0.98 | Incapable of spinning | — | — | — | — |

Remark:
C.V. means coefficient of variation

From the results shown in the Table 1, it is apparent that a silica-alumina fibers of good spinnability and excellent tensile strength and modulus of elasticity can be produced in the range of 0.1–95 mole % of phenoxy groups.

COMPARATIVE EXAMPLE 3

Except that 0.1 mole of caproic acid was used in place of ethyl o-hydroxybenzoate in the synthesis of polyaluminoxane, the procedure was carried out in the same manner as in Example 1 and a spinning solution was obtained. Said solution was subjected to spinning, but spinnability was poor and the precursor fibers thus obtained had a diameter of 28 $\mu$m. The precursor fibers were fragile and difficult to treat. The precursor fibers were calcined in the same manner as in Example 1 to obtain fibers having a diameter of 17 $\mu$m and tensile strength of 13 t/cm$^2$.

Example 11

0.2 Mole of o-methylphenoxy diethyl aluminum and 0.8 mole of triiso-propoxy aluminum were dissolved in 600 ml of dioxane and hydrolyzed by 1 mole of water and thereby a polyaluminoxane of 80 polymerization degree was obtained.

The polyaluminoxane had 80 mole % of isopropoxy groups and 20 mole % of o-methylphenoxy groups per Al atom as organic groups of the side chain. Into a dioxane solution of polymetaloxane, 0.035 mole of ethyl silicate as used in Example 1 was dissolved and the solution concentrated to a polyaluminoxane concentration of 70 weight %. After defoaming, the concentrated solution was subjected to spinning from a spinneret having 64 apertures into a spinning tube 6 m in length. The precursor fibers thus obtained had a diameter of 15 $\mu$m. Said precursor fibers were calcined in the same manner as in Example 1 and colorless and transparent silica-alumina fibers containing 10% of silica were obtained. The fibers thus obtained had a diameter of 9.0 $\mu$m with a coefficient of variation of 0.2 $\mu$m or less, average tensile strength of 23 t/cm$^2$ and a modulus of elasticity of 2,300 t/cm$^2$.

Example 12

Into a dioxane solution of a polyaluminoxane of 40 polymerization degree having 80 mole % of isopropoxy groups and 20 mole % of ethyl groups as organic groups, p-cyanophenol in an amount equivalent to 30 mole % of the organic groups was mixed and then ethyl silicate was mixed so that the silica content after calcination may be 30 weight %. Said mixture was concentrated to obtain a solution of 7,500 cp of viscosity and good spinnability. The thus obtained spinning solution was subjected to spinning to obtain precursor fibers 16 $\mu$m in diameter.

After being left to stand in an atmosphere of 100% of relative humidity at 80° C. for 30 minutes, the thus obtained precursor fibers were calcined at up to 1,200° C. to obtain very strong silica-alumina fiber of 10 $\mu$m in diameter and 23 t/cm$^2$ in tensile strength.

Comparative Example 4

Except that p-cyanophenol was not mixed, procedures were conducted in the same manner as in Example 12 and thereby silica-alumina fibers were prepared. Said silica-alumina fibers had a diameter of 18 $\mu$m, a tensile strength of 12 t/cm$^2$ and a modulus of elasticity of 1,300 t/cm$^2$.

Example 13

1 Mole of triethyl aluminum was dissolved in 600 ml of tetrahydrofuran, and then 1 mole of water and 0.1 mole of m-cresol were simultaneously added thereto to obtain a polyaluminoxane having a polymerization degree of 40. Said solution of polyaluminoxane was concentrated to provide a viscous spinning solution having a viscosity of 7500 cp, and then subjected to dry-spinning to obtain precursor fibers of good spinnability and about 16 $\mu$m in diameter.

After being left to stand in an atmosphere of 80% relative humidity at 70° C. for about 30 minutes, said precursor fibers were calcined at up to 1,200° C. to obtain alumina fibers having a fiber diameter of 10 $\mu$m, a tensile strength of 18 t/cm$^2$ and a modulus of elasticity of 1,700 t/cm$^2$.

Example 14

A benzene solution of polytitanoxane of 30 polymerization degree having 90 mole % of iso-propoxy groups and 10 mole % of

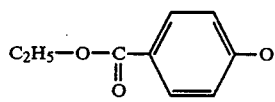

groups as organic group in a side chain was concentrated to obtain a spinning solution having a viscosity of 7,500 cp. Said solution was subjected to spinning to obtain precursor fibers 20 $\mu$m in diameter.

After being left to stand in an atmosphere of 100% relative humidity at 80° C. for 30 minutes, said precursor fibers were calcined at up to 1,200° C. to obtain very strong titania fibers having a diameter of 12 $\mu$m and a tensile strength of 12 t/cm$^2$.

Comparative Example 5

A benzene solution of a polytitanoxane having a polymerization degree of 30 and containing only isopropoxy groups as the organic group was concentrated to obtain a solution 7,500 cp in viscosity, having a spinning character. Said solution was subjected to dry-spinning to obtain precursor fibers having a diameter of 25 μm.

After being left to stand in an atmosphere of 100% relative humidity at 80° C. for 30 minutes, said precursor fibers were calcined at up to 1,200° C. to obtain titania fibers having a diameter of 15 μm and a tensile strength of 6 t/cm².

Example 15

1 Mole of tetraethoxy zirconium and 0.05 mole of triiso-propoxy yttrium were dissolved in 600 ml of tetrahydrofuran and hydrolyzed by 1 mole of water and then 0.2 mole of methyl salicylate was added thereto and mixed and thereafter the solution was concentrated to obtain a spinning solution having a viscosity of 7.000 cp. The thus obtained spinning solution was subjected to dry-spinning to obtain precursor fibers having a diameter of 30 μm. Said precursor fibers were calcined in air at a heating rate of 300° C./hr up to 1,300° C. to obtain a zirconia fibers having a fiber diameter of 18 μm, a tensile strength of 10 t/cm² and a modulus of elasticity of 1,500 t/cm².

Obviously, many modifications and variations of the invention, as hereinabove set forth, may be made without departing from the essence and scope thereof, and only such limitations should be applied as are indicated in the appended claims.

What is claimed is:

1. A process for producing inorganic fiber which comprises spinning a spinning solution in organic solvent of polymetaloxane to form a precursor fiber, followed by calcination thereof, wherein said solution contains polymetaloxane comprising 0.1–95 mole % of a structural unit represented by the following general formula and 99.9–5 mole % of the following formula:

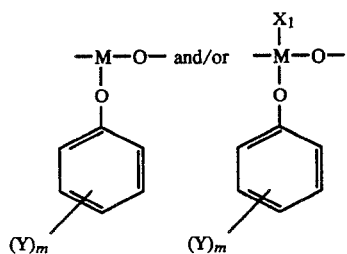

(wherein M represents a trivalent or tetravalent metal atom, Y represents an organic group, nitro or halogen, m represents an integer from 1 to 3, $X_1$ represents an organic group which is the same as or different from

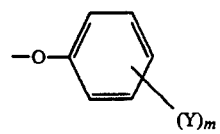

hydrogen, nitro or halogen.

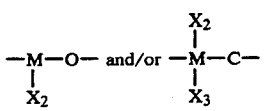

(wherein, M is the same as shown hereinabove, $X_2$ and $X_3$ represent organic group other than

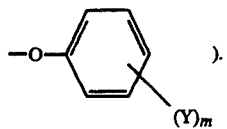

2. A process for producing inorganic fiber according to claim 1, wherein M in the general formulas [A] and [B] is one or more selected from the group comprising Al, In, Si, Sn, Ti and Zr.

3. A process for producing inorganic fiber according to claim 1, wherein the polymetaloxane comprising 99.9–5 mole % of a structural unit represented by the following general formula [A]:

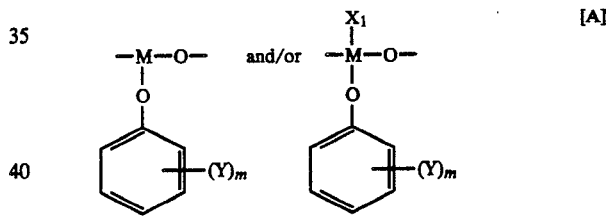

(wherein, M represents Al, In, Si, Sn, Ti or Zr, Y represents an organic group, nitro or halogen, m represents an integer from 1 to 2, $X_1$ represents an organic group which is the same as or different from the group

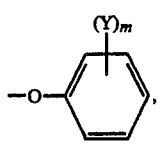

hydrogen, nitro or halogen) is used.

* * * * *